US008369581B2

(12) United States Patent
Blose et al.

(10) Patent No.: US 8,369,581 B2
(45) Date of Patent: *Feb. 5, 2013

(54) AUTOMATIC APPEAL MEASUREMENT METHOD (75) Inventors: Andrew C. Blose, Penfield, NY (US); Peter O. Stubler, Rochester, NY (US); Joseph A. Manico, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 357 days.

This patent is subject to a terminal disclaimer.

(21) Appl. No.: 12/822,432

(22) Filed: Jun. 24, 2010

(65) Prior Publication Data

US 2011/0317870 A1 Dec. 29, 2011

(51) Int. Cl.
*G06K 9/00* (2006.01)
*G06K 9/68* (2006.01)
*G06K 9/34* (2006.01)

(52) U.S. Cl. ........................ 382/115; 382/218

(58) Field of Classification Search ................. 382/103, 382/115, 118, 218–220, 254, 305; 358/1.15; 713/186; 340/5.52, 5.53; 705/1, 10, 14
See application file for complete search history.

(56) References Cited

U.S. PATENT DOCUMENTS

| | | | |
|---|---|---|---|
| 6,735,568 B1 | 5/2004 | Buckwalter et al. | |
| 7,454,357 B2 | 11/2008 | Buckwalter et al. | |
| 7,760,917 B2 * | 7/2010 | Vanhoucke et al. | 382/115 |
| 2006/0210125 A1 * | 9/2006 | Heisele | 382/118 |
| 2007/0201724 A1 | 8/2007 | Steinberg et al. | |
| 2007/0258656 A1 | 11/2007 | Aarabi | |
| 2008/0080745 A1 | 4/2008 | Vanhoucke et al. | |
| 2008/0267443 A1 | 10/2008 | Aarabi | |
| 2008/0279419 A1 | 11/2008 | Kluesing et al. | |
| 2008/0291488 A1 | 11/2008 | Lin et al. | |
| 2011/0317870 A1 * | 12/2011 | Blose et al. | 382/100 |
| 2011/0317884 A1 * | 12/2011 | Blose et al. | 382/118 |

OTHER PUBLICATIONS

Whitehill J. et al.: "Personalized facial attractiveness prediction" 8th IEEE International Conference on Automatic Face & Gesture Recognition, FG '08, Sep. 17-19, 2008, IEEE, Piscataway, NJ, USA, Sep. 17, 2008, pp. 1-7, XP031448368, ISBN: 978-1-4244-2153-4.
Gunes, et al., "Assessing facial beauty through proportion analysis by image processing and supervised learning," International Journal of Human-Computer Studies, vol. 64, pp. 1184-1199 (2006).
Boyd, et al., "Convex Optimization," Cambridge University Press, Cambridge (2004), chapter 6.
Zhao, et al., "Face Recognition: A Literature Survey", ACM Computing Surveys, vol. 35, pp. 399-458 (2003).
Cootes et al., "Active Appearance Models," Proc. 5th European Conference on Computer Vision-vol. II, pp. 484-498 (1998).

* cited by examiner

*Primary Examiner* — Amir Alavi
(74) *Attorney, Agent, or Firm* — Kevin E. Spaulding (57) ABSTRACT A method for estimating a personal appeal of a candidate individual to an observer, comprising: designating a set of proxy individuals; providing one or more digital images for each proxy individual; determining personal appeal values of each proxy individual to the observer; providing one or more digital images for the candidate individual; determining image similarity metrics between the digital images for the candidate individual and the digital images for each proxy individual; determining similarity values between the candidate individual and each proxy individual responsive to the determined image similarity metrics; and estimating the personal appeal of the candidate individual to the observer by determining a weighted combination of the personal appeal values for the proxy individuals, wherein the weighted combination uses weighting coefficients that are determined responsive to the similarity values between the candidate individual and the corresponding proxy individual.

21 Claims, 7 Drawing Sheets

FIG. 7

AUTOMATIC APPEAL MEASUREMENT METHOD

CROSS-REFERENCE TO RELATED APPLICATIONS

Reference is made to commonly assigned, co-pending U.S. Patent Application Publication No. 2011/0317884, entitled: "Automatic Appeal Measurement System", by Andrew C. Blose et al., which is incorporated herein by reference.

FIELD OF THE INVENTION

This invention pertains to the field of image processing and data analysis, and more particularly to the automatic assessment of personal appeal.

BACKGROUND OF THE INVENTION

Appeal of one person to another is a subjective measure that varies with the individuals. There are many applications when an assessment of physical attractiveness may be useful from an objective source. Examples of such applications include online dating services; talent agencies; amusement providers; providers of professional services such as clinicians, estheticians and plastic surgeons; and employers looking to hire an actor, a performer, a model, or a subject for a demonstration.

Automated systems have been invented that provide an objective measure of physical attractiveness based on facial features provided from a digital image. For example, see the article "Assessing facial beauty through proportion analysis by image processing and supervised learning" by Gunes et al. (Int. J. Human-Computer Studies, Vol. 64, pp. 1184-1199, 2006). The objective measures provided by such models are based upon a single universal estimate of appeal intended to approximate the average appeal of that person on the population at large. However, facial features alone are only part of physical attractiveness. Other physical features such as height, weight, and hair color and style can contribute to physical appeal. In addition, non-physical factors such as income, activities, level of education, personality, and social or political affiliations may also influence the overall personal appeal one individual may have to another. Such factors may be reflected in a person's style of dress, posture, and body language in a manner that is too nuanced for computer algorithms to perceive, yet are obvious to the human observer. Previous systems suffer from the inability to adapt to local cultural norms and the context of a particular application since they offer a universal model of appeal and produce only a single estimate of appeal for an individual.

What is needed is a system that allows for the automatic generation of a measurement of appeal based on digital imagery and optionally preferences learned from the user of the system.

SUMMARY OF THE INVENTION

The present invention represents a method for estimating a personal appeal of a candidate individual to an observer, comprising:

a) designating a set of proxy individuals;

b) providing one or more digital images for each proxy individual;

c) determining personal appeal values of each proxy individual to the observer;

d) providing one or more digital images for the candidate individual;

e) using a processor to determine image similarity metrics between the digital images for the candidate individual and the digital images for each proxy individual;

f) using a processor to determine similarity values between the candidate individual and each proxy individual responsive to the determined image similarity metrics;

g) using a processor to estimate the personal appeal of the candidate individual to the observer by determining a weighted combination of the personal appeal values for the proxy individuals, wherein the weighted combination uses weighting coefficients that are determined responsive to the similarity values between the candidate individual and the corresponding proxy individual; and h) storing an indication of the estimated personal appeal in a processor-accessible memory.

The present invention has the advantage that it provides a measure of personal appeal corresponding to the preferences of a specific observer, rather than a general appeal metric based on preferences for a population of observers.

It has the additional advantage that a model of personal appeal for a specific individual can be determined without requiring the observer to perform an extensive training process. This is accomplished by relating the preferences of the particular observer to those of a set of training observers who have evaluated a large number of training individuals.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image," as used herein, refers to any digital image, such as a digital still image or a digital video.

Figure 1:
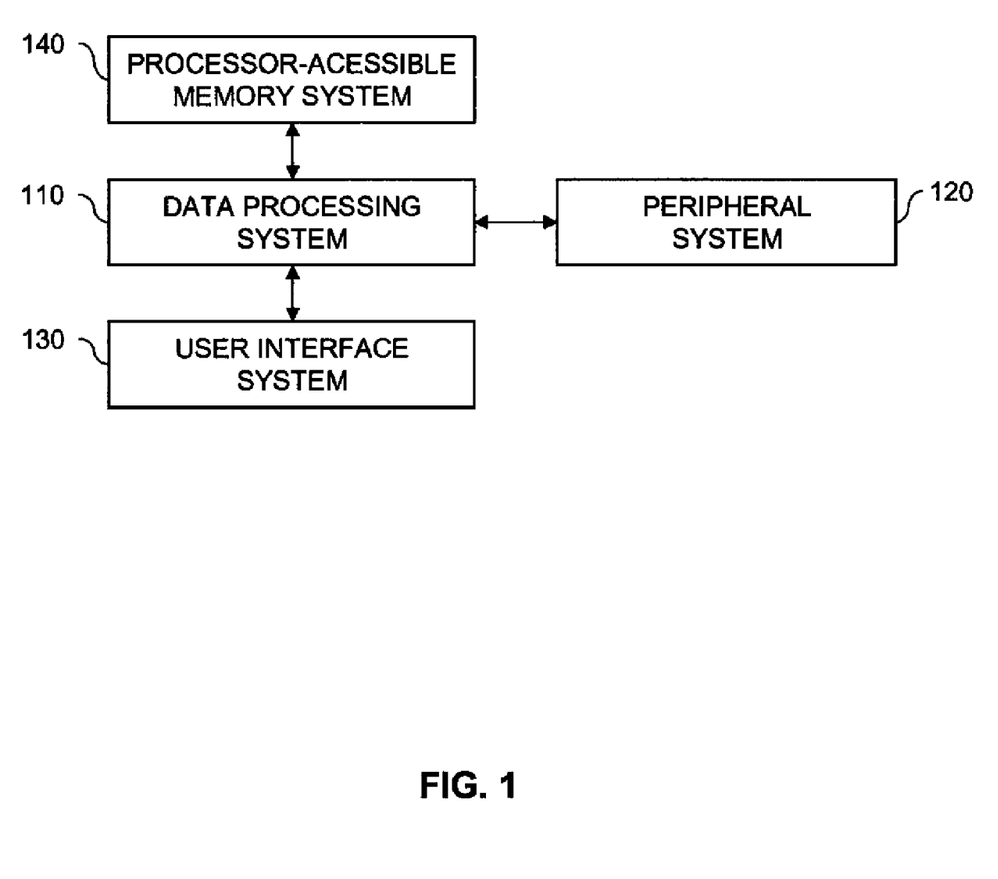
FIG. 1 is a high-level diagram showing the components of a system for assessing the personal appeal a candidate individual to an observer according to an embodiment of the present invention.

FIG. 1 is a high-level diagram showing the components of a system for automatically assessing the personal appeal of candidate individuals to an observer according to an embodiment of the present invention. The system includes a data processing system 110, a peripheral system 120, a user interface system 130, and a processor-accessible memory 140. The peripheral system 120, the user interface system 130 and the processor-accessible memory 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory 140 includes one or more processor-accessible memories configured to store information, including the information needed to execute the processes of the various embodiments of the present invention, including the example processes described herein. The processor-accessible memory 140 may be a distributed processor-accessible memory system including multiple processor-accessible memories communicatively connected to the data processing system 110 via a plurality of computers or devices. On the other hand, the processor-accessible memory 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the processor-accessible memory 140 is shown separately from the data processing system 110, one skilled in the art will appreciate that the processor-accessible memory 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the processor-accessible memory 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the processor-accessible memory 140 even though the user interface system 130 and the processor-accessible memory 140 are shown separately in FIG. 1.

In the following discussions, the term candidate individual will be used to refer to an individual whose personal appeal is being estimated or established. Generally, candidate individuals are individuals that are new to the system for which personal appeal values have not been previously established or estimated. The personal appeal of the candidate individual is expressed with respect to a person who will be referred to as the observer. The term client observer refers to an observer on whose behalf the attractiveness value of a candidate individual is being estimated. The candidate individual can also be referred to as a target candidate or simply as a candidate, and a client observer may be referred to as an observer or a user. The terms training observer and training individual will be used to respectively refer to observers and individuals employed to provide appeal values on which future estimates will be based. The terms attraction, attractiveness, personal appeal and appeal are considered to be synonymous in these discussions.

The present invention will now be described with reference to FIG. 2. There is shown a flow diagram illustrating a method for estimating the personal appeal (attractiveness) of a candidate individual to a client observer. In order to estimate the personal appeal of a candidate individual to a user, the system must first be trained relative to the preferences of the observer. First a collect training data step 210 is used to collect personal appeal data for a set of training observers. In this step, the training observers provide personal appeal values for each member of a set of training individuals. The personal appeal values are determined, at least in part, by viewing photographs (e.g., digital images) of the training individuals to evaluate their physical attractiveness, although other factors may also be considered. Generally, the client observer will not be one of the training observers.

A train proxy observer model step 220 is next used to enroll a new user (the client observer) in the system. The enrollment process involves learning the preferences of the new user in order to construct a proxy observer model that emulates these preferences by correlating the user preferences with the preferences of a set of proxy observers. Note that the enrollment process does not have to be associated with a time of enrollment of an observer in a system. In general, it can be performed at any time to determine a new or updated evaluation of observer preferences.

In acquire candidate individual information step 230, information describing the candidate individual is acquired. In a preferred embodiment, the acquired information includes at least one digital image (i.e., a photograph or video) of the candidate individual. Additional information may also be acquired such as height, weight, age, education, income and interests.

Next, an estimate personal appeal step 240 is used to estimate the personal appeal of the candidate individual with respect to the client observer. This step includes using a processor to determine similarity values between the candidate individuals and a set of proxy individuals. The similarity values are based, at least in part, on image similarity metrics determined between a digital image for the candidate individuals and digital images for a set of proxy individuals. The similarity values are used to determine weighting coefficients that are used for a weighted combination of personal appeal values for the proxy individuals. In a preferred embodiment, the personal appeal values for at least a subset of the proxy individuals are determined using the proxy observer model determined in the train proxy observer model step 220. In some embodiments, the personal appeal values for some (or all) of the proxy individuals are determined by having the client observer evaluate the personal appeal of the proxy individuals.

A store estimated personal appeal step 250 is used to store the resulting estimated personal appeal of the candidate individual to the client observer in a processor-accessible memory. The estimated personal appeal can also be reported to the client observer, for example by displaying the personal appeal value on a user interface.

In some embodiments, the client observer is given the opportunity to confirm or correct the estimated personal appeal value. If so, the corrected personal appeal value is stored in the processor-accessible memory for future reference. In some embodiments, the determined personal appeal value for the candidate individual can be used in the process of estimating the personal appeal of future candidate individuals. This is most appropriate for cases where the client observer has confirmed or corrected the estimated personal appeal value since these personal appeal values should represent more accurate training data. One way that the determined personal appeal value can be used in the process of estimating the personal appeal of future candidate individuals is to add the candidate individual to the set of proxy individuals.

Figure 3:
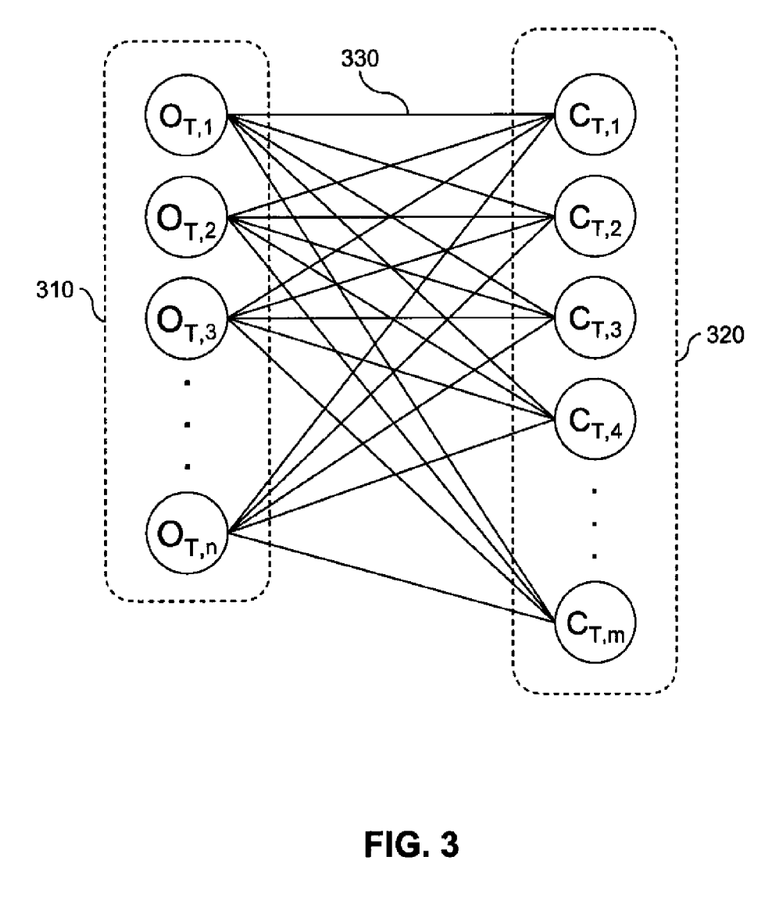
FIG. 3 is a diagram illustrating a set of training observers and training individuals.

FIG. 3 illustrates additional details relevant to the collect training data step 210. In this step, training data is collected for a set of training observers 310 and a set of training individuals 320. The elements $O_{T,k}$ represent the $k^{th}$ training observer 310. The elements $C_{T,j}$ represent the $j^{th}$ training individual 320. The lines joining the training observers and training individuals represent the corresponding appeal values 330 of the training individuals 320 to the training observers 310. The appeal value of the $j^{th}$ training individual to the $k^{th}$ training observer will be referred to as $A(C_{T,j}, O_{T,k})$. This appeal values 330 are obtained by displaying information about a training individual 320 to a training observer 310 and recording the appeal value 330 provided by the training observer 310. In a preferred embodiment, the displayed information about a training individual includes a digital image (e.g., a digital still image or a digital video) of the training individual. The displayed information can also include other types of information such as age, height, weight, hair color, hair style, income, activities, level of education, personality, social affiliations and political affiliations. This set of training data forms the basis from which future estimates of personal appeal will be derived.

The set of training individuals 320 and training observers 310 should preferably be large enough to encompass much of the inherent diversity in each population. The diversity of the population of training individuals 320 may result in a large training task for each of the training observers 310. Therefore, it may be preferable to limit in the training task by forming a subset of the training individual population by sampling the training individual population for each training observer 310. In the preferred embodiment, the sampling is non-uniform and favors the selection of training individuals 320 with similar demographic background. For instance, the probability of the selection of a training individual 320 drops as the difference between the ages of the training individual 320 and training observer 310 increases.

Figure 4:
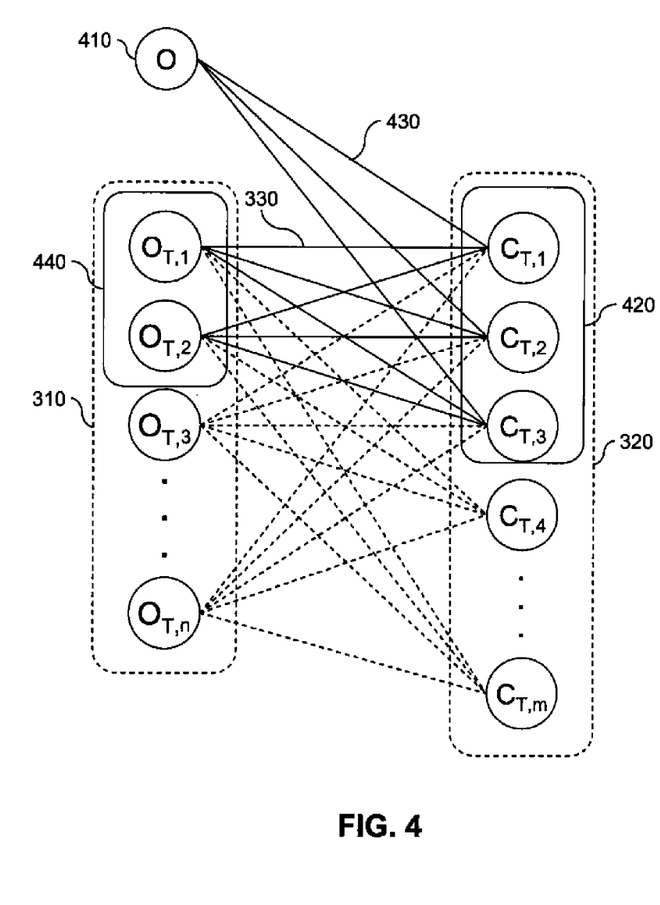
FIG. 4 is a diagram showing details relevant to the training of a proxy observer model.

FIG. 4 is a diagram illustrating additional details relevant to the train proxy observer model step 220. When a new observer 410 is added to the system, the preferences of the new observer 410 are assessed, and a proxy observer model is formed that can be used to predict those preferences by correlating the new observer preferences with the preferences of a set of proxy observers. In a preferred embodiment, the new observer 410 is presented with a subset of the training individual population called an enrollment subset 420 and asked to provide corresponding new observer appeal values 430. The new observer appeal value of the $j^{th}$ training individual to the new observer will be referred to as $B(C_{T,j}, O)$.

The enrollment subset 420 may be far smaller than the total population of training individuals 320. In a preferred embodiment, the enrollment subset 420 is selected in such a way as to cover much of the diversity of the population of training individuals 320. In other embodiments, the enrollment subset 420 can be selected to emphasize a particular demographic range of interest. For example, the enrollment subset 420 can be selected to include only training individuals 320 within a specific age range according to preferences expressed by the observer 410.

Once the new observer has provided new observer appeal values 430 for each member of the enrollment subset 420, a subset of training observers called proxy observers 440 is selected. Proxy observers 440 are a set of training observers 310 whose appeal values 330 for the enrollment subset can be combined in such a way as to approximate the new observer appeal values 430 associated with the new observer 410. In a preferred embodiment, the proxy observers 440 are chosen such that a linear combination of their appeal values 330 closely approximates the new observer appeal values 430 associated with the new observer. In equation form, this can be expressed as:

$$B(C_{T,j}, O) \approx \sum_{k=1}^{N} X_k A(C_{T,j}, O_{T,k}) \tag{1}$$

where N is the number of proxy observers 440, and $X_k$ is a weighting coefficient for the $k^{th}$ proxy observer. The selected proxy observers 440 and respective set of weighting coefficients constitute a proxy observer model that can be used to approximate appeal values for the remaining training individuals 320 that have not been evaluated by the new observer 410.

Those skilled in the art will recognize that there are a variety of methods that can be used to select the proxy observers 440 and calculate the corresponding weighting coefficients. In one embodiment, the entire population of training observers 310 are used as proxy observers 440. The corresponding weighting coefficients can then be determined using standard least-squares regression. More formally, the least square regression process can be expressed as:

$$\min \|AX-B\|_2^2 \quad (2)$$

where $\|\cdot\|_2$ is the 2-norm operator, A is an M×N matrix of appeal values 330 between training observers 310 in the set of proxy observers 440 and training individuals 320 in the enrollment subset 420:

$$A = \begin{bmatrix} A(C_{T,1}, O_{T,1}), A(C_{T,1}, O_{T,2}), \ldots, A(C_{T,1}, O_{T,N}) \\ A(C_{T,2}, O_{T,1}), A(C_{T,2}, O_{T,2}), \ldots, A(C_{T,2}, O_{T,n}) \\ \vdots \\ A(C_{T,M}, O_{T,1}), A(C_{T,M}, O_{T,2}), \ldots, A(C_{T,M}, O_{T,N}) \end{bmatrix} \quad (3)$$

M being the number of training individuals 320 in the enrollment subset 420, B is an M-length vector of new observer appeal values 430 provided by the new user for the training individuals 320 in the enrollment subset 420:

$$B = [B(C_{T,1},O), B(C_{T,2},O), \ldots, B(C_{T,M},O)]^T \quad (4)$$

$[\cdot]^T$ being the transpose operator, and X is an N-length vector of weighting coefficients associated with the proxy observers 440 that are determined to minimize the prediction error:

$$X = [X_1, X_2, \ldots, X_N]^T \quad (5)$$

It can be seen that only a subset of the appeal values 330 in FIG. 4 are involved in these calculations. This subset is shown using solid lines, while the unused appeal values 330 are shown using dashed lines. Once the proxy observer model has been formed, it can be used to predict the personal appeal of any of the training individuals 320 to the new observer 410 using Eq. (1), even including the training individuals 320 not in the enrollment subset 420.

Those skilled in the art will also recognize that a smaller set of proxy observers 440 can be selected and corresponding weighting coefficient may be obtained using well-known optimization techniques such as those described by Boyd and Vandenberghe in Chapter 6 of the book "Convex Optimization" (Cambridge University Press, Cambridge, 2004). In some embodiments, the basis pursuit technique described in section 6.5.4 of the above mentioned book, is used to determine a minimum number of proxy observers needed to provide an adequate estimate of an observer's personal preferences.

In the example shown in FIG. 4, the number of training individuals 320 in the enrollment subset 420 is M=3 and the number of proxy observers 440 is N=2, although preferably a larger enrollment subset 420 and a larger number of proxy observers 440 would be used. In practice, the size of the enrollment subset 420 will be limited by the number of evaluations that the new observer 410 is willing to make. If the number is too large, the enrollment process will become too cumbersome for the new observer 410 to tolerate. The number of proxy observers 440 can be as large as necessary to provide a good fit to the new observer appeal values 430, without over-fitting the random variability in the data.

The linear combination of appeal values 330 given in Eq. (1) is a specific example of a more general case where the new observer appeal values 430 are expressed as a weighted combination of the appeal values 330 for the proxy observers 440, wherein the weighted combination uses weighting coefficients determined responsive to the new observer appeal values 430 and the appeal values 330 for the proxy observers 440 in the set of training observers 310. In other embodiments, the weighted combination can include additional terms beyond the simple linear combination terms. For example, the weighted combination can include higher-order terms such as quadratic terms and cross-terms.

Figure 5:
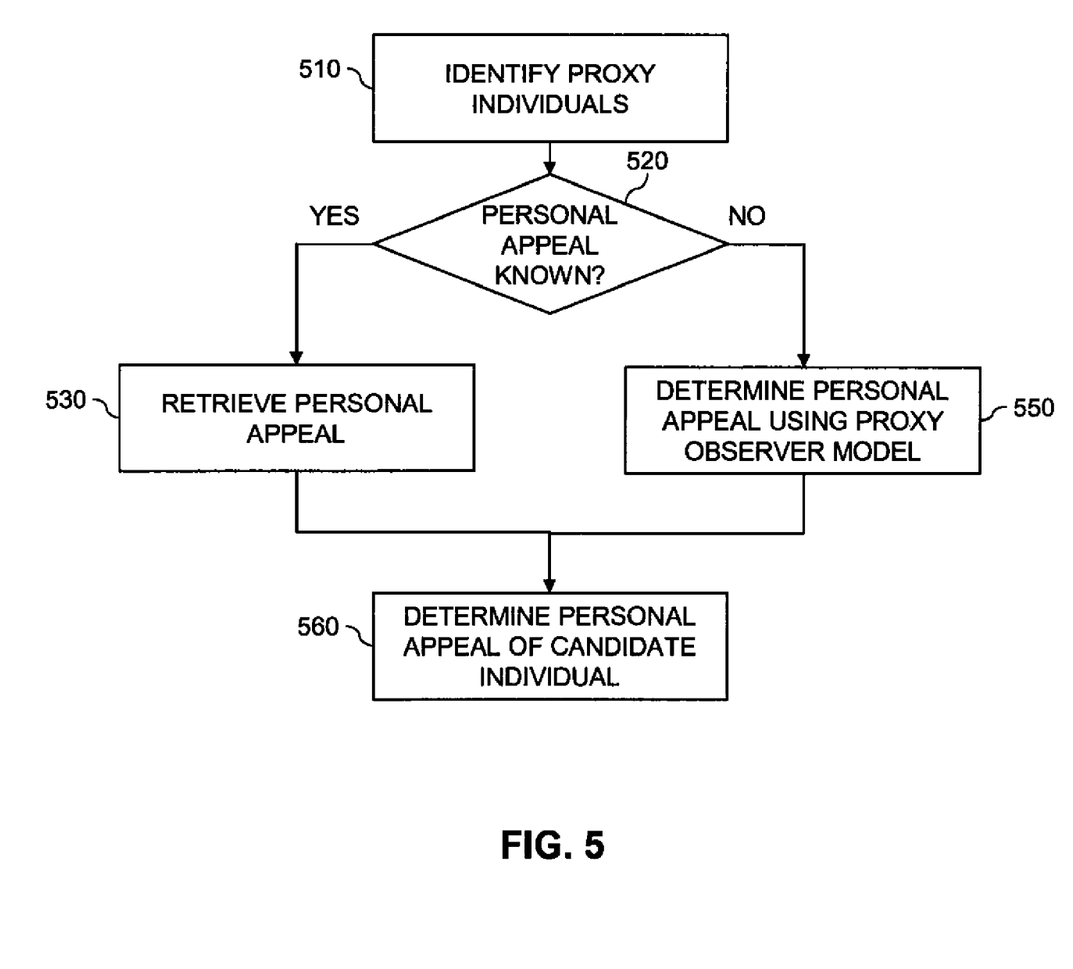
FIG. 5 is a flow diagram showing additional details of the estimate personal appeal step in FIG. 2.

FIG. 5 illustrates additional details relevant to the estimate personal appeal step 240, which estimates the personal appeal of a candidate individual to a particular observer. The appeal estimation process begins with an identify proxy individuals step 510 which identifies a set of individuals that will act as proxies for a candidate individual. The set of proxy individuals can be composed of a combination of training individuals 320 and previous individuals for which the particular observer has provided actual personal appeal values. In a preferred embodiment, the proxy individuals are selected by measuring the similarity of the candidate individuals to each potential proxy individuals. The set of proxy individuals may be limited to those potential individuals having a degree of similarity that surpasses a predefined threshold, or by limiting the number of proxy individuals to a specified number of individuals having the highest degree of similarity.

Those skilled in the art will recognize that many similarity measurements and features may be used within the scope of this invention. In a preferred embodiment, the degree of similarity is determined responsive to an image similarity metric which represents the similarity between digital images of the candidate individual and the proxy individuals. In some embodiments, the image similarity metric is determined using a facial similarity metric which represents the similarity of the faces of the candidate individual and the proxy individual. Any algorithm for determining facial similarity metrics known in the art can be used in accordance with the present invention. For example, a survey of applicable methods for determining facial similarity metrics is described by W. Zhao et al. in the article "Face Recognition: A Literature Survey" (ACM Computing Surveys, Vol. 35, pp. 399-458, 2003).

In a preferred embodiment, a facial similarity metric based upon a unified Principle Component Analysis (PCA) and Linear Discriminant Analysis (LDA) can be employed. Using this approach, each face can be represented using a principle component model that expresses both the shape and texture of the face. An example of this is the Active Appearance Model (AAM) described by Cootes et al. in the article "Active Appearance Models" (Proc. 5th European Conference on Computer Vision, Vol. II, pp. 484-498, 1998). The similarity between any two faces can be established by comparing the respective eigenvalues. A coordinate transformation for the eigenvalues can be determined using LDA so as to maximize the distance between faces which depict different people while minimizing the distance between faces which depict the same person. The distance between the representations of two faces in this transformed space is therefore a measure of the dissimilarity between the two faces, where larger distances correspond to larger differences.

The dissimilarity distance value can then be used to determine the facial similarity metric by applying Bayesian analysis as described in the aforementioned article by Zhao et al. Alternately, the dissimilarity distance value can be mapped through an appropriate nonlinear transformation, such as a sigmoid function of the form:

$$S_f = \frac{1}{1 + e^{-m(h - D_f)}} \quad (6)$$

where $S_f$ is the facial similarity metric, $D_f$ is the facial dissimilarity distance value, h is the inflection point of the sigmoid, and m is the slope of the sigmoid at the inflection point.

For the case where more than one digital image of a particular individual is available, image similarity metrics can be computed for each of the digital images. In one embodiment, the image similarity metric with the highest value for a pair of individuals is selected. In other embodiments, the image similarity metrics computed for the different digital images can be combined (e.g., by averaging them).

A personal appeal known test 520 is used to determine whether the appeal of each proxy individual to the observer is known. Appeal values will be available for training individuals 320 in the enrollment subset 420, as well as for previous candidate individuals for which the observer has provided actual appeal values. If the personal appeal value of a particular proxy individual to the observer is known, a retrieve personal appeal step 530 is used to retrieve the personal appeal value for use in subsequent calculations.

If the personal appeal value of a particular proxy individual to the observer is not known, a determine personal appeal using proxy observer model step 550 is used to estimate the personal appeal of the particular proxy individual to the observer. This is accomplished using the proxy observer model determined in the train proxy observer model step 220 (FIG. 2). As described earlier, the proxy observer model estimates the personal appeal of an individual by determining a weighted combination of personal appeal values of the individual to the proxy observers (e.g., using Eq. (1)).

In determine personal appeal of candidate individual step 560, a personal appeal value of the candidate individual to the observer is estimated by calculating a weighted combination of the personal appeal values for proxy individuals. The weighted combination combines the personal appeal values using weighting coefficients that are created by normalizing the similarity scores for each proxy individual.

The personal appeal values of the proxy individuals, together with corresponding information about the proxy individuals constitutes a personal appeal model for the observer. In a preferred embodiment the information about the proxy individuals includes digital images of the proxy individuals, as well as other information that can be used to determine similarity values between a candidate individual and the proxy individuals.

In a preferred embodiment, the similarity scores are determined responsive to the image similarity metric which represents the similarity between digital images of the candidate individual and the proxy individuals. As discussed earlier, the image similarity metric is preferably a facial similarity metric which represents the similarity of the faces of the candidate individual and the proxy individual. In some embodiments, the similarity score can also incorporate other factors such as similarity in age, height, weight, hair color, hair style, income, activities, level of education, personality, cultural heritage, religion, social affiliations and political affiliations.

In some embodiments, a similarity score incorporating other factors besides facial similarity can be determined by computing a combined distance metric that incorporates the facial dissimilarity distance value as well as other distance terms corresponding to the other factors:

$$D = \sqrt{c_f D_f^2 + \sum_i c_i D_i^2} \quad (7)$$

where D is the combined distance metric, $D_f$ is the facial dissimilarity distance value, $D_i$ is a dissimilarity distance value for the $i^{th}$ factor, and $C_f$ and $C_i$ are weighting factors for the corresponding distance values.

For some of the other factors, such as age, height and weight, which are numerical in nature the dissimilarity distance value can simply be the difference between the numerical values (e.g., the difference in the ages). Alternately, a non-linear transformation can be applied to the difference between the numerical values (e.g., to place added emphasize on large age differences). For other factors, such as hair color or hair style, which do not have inherent numerical values, various schemes can be used to define dissimilarity distance values. For example, a binary system can be used where a matching attribute is assigned a value of "0" while a non-matching attribute is assigned a value of "1."

A combined similarity score can then be determined from the combined distance metric by applying an appropriate nonlinear transformation, such as a sigmoid function shown in Eq. (6). Alternately, a combined similarity metric can be determined by applying Bayesian analysis as described in the aforementioned article by Zhao et al.

In alternate embodiments, other methods can be used to determine a combined similarity score that combines a facial similarity value with various other features. For example, U.S. Patent Application Publication 2008/0080745 teaches several methods for determining a similarity score based on a facial similarity value.

In a preferred embodiment, the determination of the personal appeal value of the candidate individual to the observer is estimated by calculating a weighted summation of the personal appeal values for proxy individuals:

$$A(C, O) \approx \sum_{j=1}^{M_p} W_j A(C_{P,j}, O) \quad (7)$$

where C is the candidate individual, O is the observer, $C_{P,j}$ is the $j^{th}$ proxy individual, $M_p$ is the number of proxy individuals, $W_j$ is a weighting coefficient for the $j^{th}$ proxy individual, $A(C_{P,j}, O)$ is the personal appeal value of the $j^{th}$ proxy individual to the observer and $A(C, O)$ is the estimated personal appeal value of the candidate individual to the observer. It will be obvious to one skilled in the art that other types of weighted combinations can be used to estimate the personal appeal value of the candidate individual in accordance with the present invention. For example, the weighted combination can include nonlinear terms such as quadratic terms.

In a preferred embodiment, the weighting coefficient $W_j$ for the $j^{th}$ proxy individual can be determined from the similarity scores using the following equation:

$$W_j = \frac{S(C, C_{P,j})}{\sum_{k=1}^{M_p} S(C, C_{P,k})} \quad (8)$$

where $S(C, C_{P,j})$ is the similarity score between the candidate individual C and the $j^{th}$ proxy individual $C_{P,j}$. It can be seen that the effect of this equation is that the weighting coefficients are determined by normalizing the similarity scores by the sum of the similarity scores. Thus the sum of the weighting coefficients for the proxy individuals will be 1.0. The weighting coefficients for the proxy individuals that are most similar to the candidate individual will be highest, and the weighting coefficients for the proxy individuals that are least similar to the candidate individual will be lowest.

Figure 2:
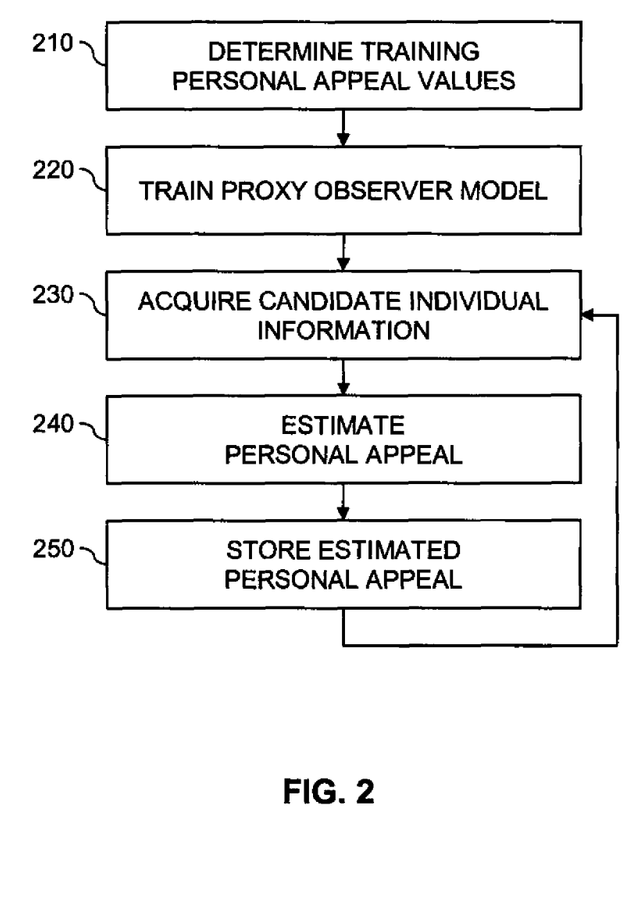
FIG. 2 illustrates a flow-chart of a method for practicing the various methods of assessing the personal appeal a candidate individual to an observer according to an embodiment of the present invention.
Figure 6:
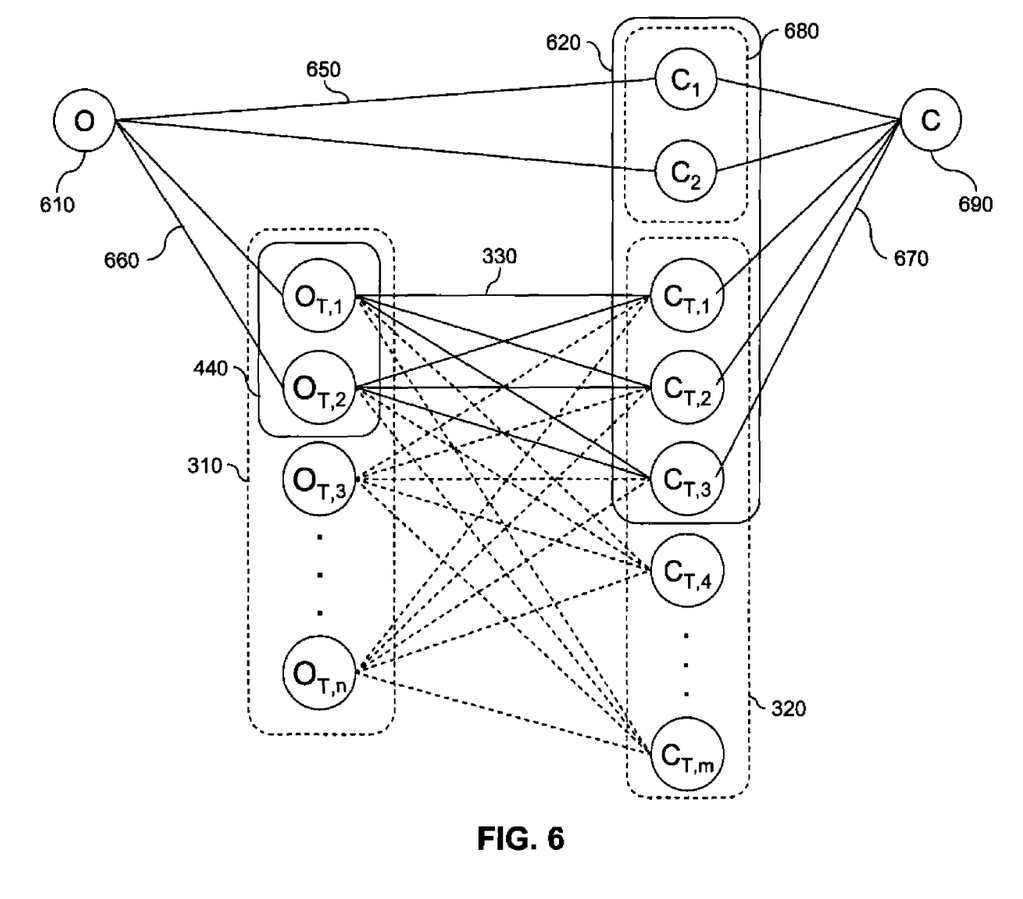
FIG. 6 illustrates a data-centric view of the personal appeal estimation process of FIG. 2.

FIG. 6 illustrates a data-centric view of the appeal estimation process described by FIG. 2. The goal is to estimate the appeal of a candidate individual 690 to an observer 610. A set of proxy individuals 620 known to the system is selected to act as a proxy for the candidate individual 690. Some of the proxy individuals 620 may be chosen from a set of previously observed individuals 680 for which actual appeal values 650 are known, and some may be chosen from the training individuals 320. It should be noted that the training individuals 320 selected for use as proxy individuals 620 is independent of the selection of the training individuals 320 for use in the enrollment subset 420 (FIG. 4).

In some embodiments, the set of proxy individuals 620 includes only previously observed individuals 680 and no training individuals 320. In order for this approach to produce high quality results, it is necessary that a fairly large number of previously observed individuals 680 should be evaluated by the observer 610. This implies that the enrollment process would need to be more extensive than would be necessary when the set of proxy individuals 620 also contains training individuals 320. In some embodiments, the set of proxy individuals 620 includes only training individuals 320 and no previously observed individuals 680.

The appeal values 650 for each of the proxy individuals 620 chosen from previously observed individuals 680 can be used without respect to the proxy observers 440. The appeal values 650 may have been determined by the observer 610 directly evaluating the previously observed individuals 680 during the enrollment process, or at some other time. In some embodiments, the client observer 610 is given the opportunity to confirm or correct the estimated personal appeal value of a particular individual. If so, the set of previously observed individuals 680 can be updated to include the particular individual.

Appeal values 650 for each of the proxy individuals 620 chosen from the set of training individuals 320 that were not directly evaluated by the observer 610 are estimated using the proxy observer model described earlier. The proxy observer model estimates the personal appeal value of an individual by computing a weighted combination of the appeal values 330 between a particular training individual 320 and the proxy observers 440 established for the observer 610. In a preferred embodiment, the weighted combination is performed using the weighted summation given in Eq. (1). The weighted summation uses weighting coefficients 660 ($X_k$) that were established when the proxy observers were chosen at enrollment time. The appeal values 330 that are involved in the calculation of the personal appeal of the proxy individuals are shown using solid lines in FIG. 6. The appeal values 330 that are not involved in these calculations are shown using dashed lines.

Finally, in a preferred embodiment, the personal appeal value of the candidate individual 690 is estimated by computing a weighted sum of the personal appeal values of the proxy individuals 620. As described earlier with respect to Eq. (7), the weighted sum is calculated using weighting coefficients 670 ($W_j$) that are determined by normalizing similarity values between the proxy individuals 620 to the candidate individual 690 as described in Eq. (8).

While the preferred embodiment of this invention applies to the personal appeal of one human to another, those skilled in the art will readily recognize that the invention can be exercised to estimate the appeal of any type of "individual," subject to the availability of a valid similarity measurement that accurately estimates the similarity between individuals. For instance, if one were to provide a metric to estimate the similarity between automobiles based upon features such as color, size, horsepower, body style, etc. one could exercise the method of this invention to estimate the appeal of a candidate car to an observer. An example of such a metric could be to classify each automobile by body style: coupe, sedan, SUV, crossover, van, pickup, etc. Similarity of continuous values such as color, size, and horsepower could be determined by comparing the difference in their respective values to a threshold. Based on these features, a weighted Hamming distance between automobiles could be employed to provide an overall similarity measurement.

The invention as so far described is single directional, in that the personal appeal of the candidate individual to the observer has been estimated without any consideration of the personal appeal of the observer to the candidate individual. However, it will be obvious to one skilled in the art that the present invention may be exercised in a manner to determine a mutual appeal. In this configuration, an individual may provide information to the system with the goal of identifying other individuals that they would find appealing and who are likely to find the individual mutually appealing. One means for computing a mutual appeal value would be to compute the appeal of the first individual to the second individual using the above described method. Likewise, the appeal of the second individual to the first individual can be determined in the same fashion. The two appeal values can then be combined in some appropriate manner such as by forming the sum or product of the appeal values. The system can then report the mutual appeal value in addition to, or instead of the single-directional appeal value.

Another application of the present invention is to provide observers with information about what they could do to make themselves more appealing to others. For example, a set of target individuals can be identified that the observer finds to be appealing. Appeal models for each of these target individuals can then be used to identify other individuals that the target individuals find to be appealing. Information about this set of other individuals (e.g., photographs, activities, social affiliations and political affiliations) can be shared with the observer to provide insight about ways for the observer to optimize his or her appeal to the set of target individuals. In another embodiment, observers can use image editing software to modify their personal appearance in order to evaluate how it would affect their appeal to the set of target individuals. For example, the observer can evaluate attributes such as hair style, facial hair style, eyeglasses, dental work, facial jewelry, clothing style and facial expression would affect their level of appeal.

Another application of the present invention is to create a model of appeal for a population of observers rather than for a single observer. This can be done by combining appeal values for a set of observers that represent the desired population. For instance, an advertiser may wish to target males between the ages of 39 and 55, from a particular geographic region, having a desired income range. a set of observers can be identified that satisfy a set demographic criteria specified by the advertiser, and an overall appeal value can be determined by combining individual appeal values corresponding to each observer. Using this model, they can identify candidate individuals with the highest appeal to this chosen population.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Figure 7:
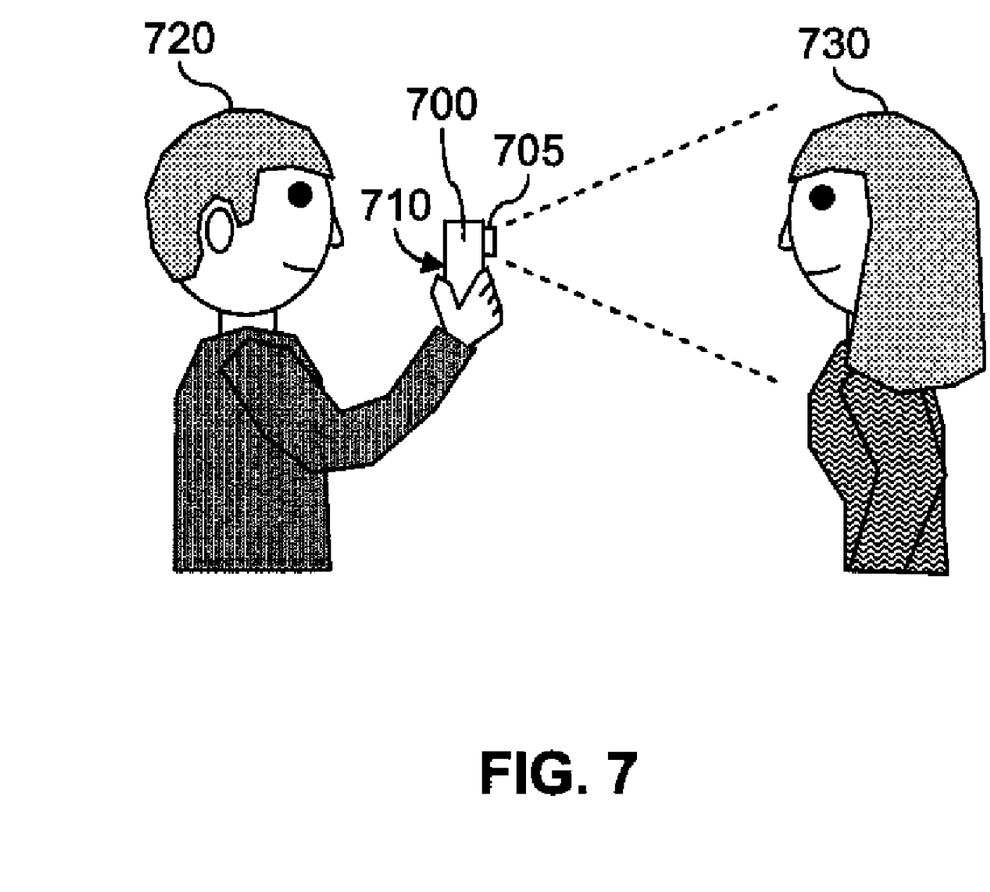
FIG. 7 illustrates a portable appeal estimation device.

According to some embodiments of the present invention, the above-described method for estimating the personal appeal of a candidate individual is included in a portable appeal estimation device. FIG. 7 shows an example of such a portable appeal estimation device 700. In this embodiment, the portable appeal estimation device 700 includes a digital image capture device 705, such as a digital camera, which can be used by an observer 720 to capture digital images of a candidate individual 730. The appeal estimation device 700 also includes a soft-copy display 710, which can, for example, be located on the back of the appeal estimation device 700. In some embodiments, the appeal estimation device 700 is mobile computational device such as a cellular telephone device or a tablet computer.

In a preferred embodiment, the appeal estimation device 700 also includes a data processing system (not shown), a personal appeal model memory system (not shown) communicatively connected to the data processing system and storing information about a set of proxy individuals including digital images of each proxy individual and personal appeal values of each proxy individual to the observer, and a program memory system (not shown) communicatively connected to the data processing system and storing instructions configured to cause the data processing system to determine an estimated personal appeal of the candidate individual to the observer using the above-described method. An indication of the resulting estimated personal appeal is displayed to the observer 720 on the soft-copy display 710.

In some embodiments, the indication of the personal appeal can be a numerical value (e.g., a number between 1 and 10). In other embodiments, the indication of the personal appeal can be provided in some other form such as a star rating (e.g., 1 to 5 stars) or a bar graph where the length of the bar is an indication of the estimated personal appeal. It will be obvious to those skilled in the art that there are a wide variety of ways that can be used to represent the estimated personal appeal value.

In some embodiments, the process of training a personal appeal model (e.g., the process of determining personal appeal values of a set of proxy individuals to the observer) can be carried out by performing the above-described enrollment process using software stored in the memory system within the appeal estimation device 700 and executed using the data processing system within the appeal estimation device 700.

In other embodiments, the personal appeal model is trained using a process which is executed using external system components such as a remote computer. The resulting personal appeal model can then be loaded into the appeal estimation device 700, or can be retained on the remote computer. Retaining the personal appeal model on the remote computer can be a desirable alternative when the appeal estimation device 700 does not have the computational power required to process a captured digital image using the personal appeal model.

In some embodiments, the process of analyzing a captured digital image determine an estimated personal appeal can be carried out using software stored in the memory system within the appeal estimation device 700 and executed using the data processing system within the appeal estimation device 700. In this configuration, the appeal estimation device 700 is a stand-alone device for determining personal appeal values.

In alternate embodiments, the captured digital image is transmitted to a remote computing system for processing using a remote data processor. For example, the appeal estimation device 700 can be a cellular telephone such that captured digital image can be transmitted using a cellular telephone connection. Alternately, the captured digital image can be transmitted over a wired connection or over some other form of wireless connection, such as a WiFi connection or a Bluetooth connection. The estimated personal appeal value determined on the remote computing system is then transmitted back to the appeal estimation device 700 for display on the soft-copy display 710.

Portable appeal estimation devices 700 can be useful for individual users who wish to evaluate the personal appeal of individuals they may encounter. In this case, the appeal estimate device 700 can be configured to determine the personal appeal relative to the preferences of the individual user. Portable appeal estimation devices 700 can also be useful for applications such as talent agencies evaluating potential clients; providers of professional services such as clinicians, estheticians and plastic surgeons; and employers looking to hire an actor, a performer, a model, or a subject for a demonstration. In these case, the appeal estimation device 700 can be configured to determine the appeal relative to a specified demographic. In one embodiment, a menu can be provided on a user interface of the estimation device 700 that allows the user to choose between a number of predefined demographic segments.

The invention has been described in detail with particular reference to certain preferred embodiments thereof, but it will be understood that variations and modifications can be effected within the spirit and scope of the invention.

Parts List

110 Data processing system
120 Peripheral system
130 User interface system
140 Processor-accessible memory system
210 Collect training data step
220 Train proxy observer model step
230 Acquire candidate individual information step
240 Estimate personal appeal step
250 Store estimated personal appeal step
310 Training observer
320 Training individual
330 Appeal value
410 New observer
420 Enrollment subset
430 New observer appeal value
440 Proxy observers
510 Identify proxy individuals step
520 Personal appeal known test 530 Retrieve personal appeal step
550 Determine personal appeal using proxy observer model step
560 Determine personal appeal of candidate individual step
610 Observer
620 Proxy individuals
650 Appeal value
660 Weighting coefficient
670 Weighting coefficient
680 Previously observed individuals
690 Candidate individual
700 Appeal estimation device
705 Digital image capture device
710 Soft-copy display
720 Observer
730 Candidate individual

The invention claimed is:

1. A method for estimating a personal appeal of a candidate individual to an observer, comprising:
   a) designating a set of proxy individuals;
   b) providing one or more digital images for each proxy individual;
   c) determining personal appeal values of each proxy individual to the observer;
   d) providing one or more digital images for the candidate individual;
   e) using a processor to determine image similarity metrics between the digital images for the candidate individual and the digital images for each proxy individual;
   f) using a processor to determine similarity values between the candidate individual and each proxy individual responsive to the determined image similarity metrics;
   g) using a processor to estimate the personal appeal of the candidate individual to the observer by determining a weighted combination of the personal appeal values for the proxy individuals, wherein the weighted combination uses weighting coefficients that are determined responsive to the similarity values between the candidate individual and the corresponding proxy individual; and
   h) storing an indication of the estimated personal appeal in a processor-accessible memory.

2. The method of claim 1 wherein personal appeal values for at least a subset of the proxy individuals are determined by having the observer evaluate the personal appeal of the proxy individuals.

3. The method of claim 2 wherein the evaluation of the personal appeal of the proxy individuals includes having the observer evaluate the physical attractiveness of the proxy individuals based on viewing the digital images of the proxy individuals.

4. The method of claim 2 wherein the evaluation of the personal appeal of the proxy individuals includes having the observer evaluate non-image information pertaining to the proxy individuals.

5. The method of claim 4 wherein the non-image information includes age, height, weight, hair color, hair style, income, activities, level of education, personality, social affiliations or political affiliations.

6. The method of claim 1 wherein personal appeal values for at least a subset of the proxy individuals are determined by:
   (i) designating a set of proxy observers and a set of training individuals, wherein the subset of proxy individuals are included in the set of training individuals;
   (ii) determining training personal appeal values of the training individuals to the proxy observers;
   (iii) determining observer personal appeal values of at least a subset of the training individuals to the observer;
   (iv) determining a proxy observer model that relates the training personal appeal values to the observer personal appeal values; and
   (v) using the proxy observer model to determine the personal appeal values of the proxy individuals to the observer responsive to the training personal appeal values.

7. The method of claim 6 wherein the proxy observer model determines the personal appeal value of a particular individual to the observer by determining a weighted combination of corresponding training personal appeal values of the particular individual to the proxy observers, and wherein the weighted combination uses weighting coefficients determined responsive to the training personal appeal values and the observer personal appeal values.

8. The method of claim 7 wherein the weighted combination is a weighted summation, and wherein the weighting coefficients are determined using a linear least squares regression algorithm.

9. The method of claim 1 wherein the image similarity metric is a facial similarity metric.

10. The method of claim 1 wherein the similarity values are also determined responsive to the similarity of non-image information pertaining to the candidate individual and the proxy individuals.

11. The method of claim 10 wherein the non-image information includes age, height, weight, hair color, hair style, income, activities, level of education, personality, social affiliations or political affiliations.

12. The method of claim 1 wherein the weighted combination of the personal appeal values is a weighted summation, and wherein the weighting coefficient for a particular proxy individual is determined by normalizing the similarity values for the particular proxy individual by the sum of the similarity values for all of the proxy individuals.

13. The method of claim 1 further including displaying an indication of the estimated personal appeal to the observer using a user interface on a display device.

14. The method of claim 13 wherein the estimated personal appeal for a plurality of candidate individuals is simultaneously displayed on the user interface.

15. The method of claim 14 wherein the candidate individuals are ordered on the user interface according to the estimated personal appeal.

16. The method of claim 1 further including:
   estimating a personal appeal of the observer to the candidate individual; and
   determining a mutual personal appeal between the candidate individual and the observer by combining the estimated personal appeal of the candidate individual to the observer with the estimated personal appeal of the observer to the candidate individual.

17. The method of claim 16 wherein the mutual personal appeal is determined by computing the sum or the product of the estimated personal appeal of the candidate individual to the observer and the estimated personal appeal of the observer to the candidate individual.

18. The method of claim 1 wherein estimated personal appeal values are determined for a set of observers, and wherein the estimated personal appeal values are combined to determine a combined appeal value.

19. The method of claim 18 wherein the set of observers are selected to satisfy a set of demographic criteria.

20. The method of claim 19 wherein combined appeal values are determined for a set of candidate individuals who are being considered for use in an advertisement targeted at consumers satisfying the set of demographic criteria.

21. A computer program product for estimating a personal appeal of a candidate individual to an observer comprising an executable software application stored on a non-transitory tangible computer readable storage medium for causing a data processing system to perform the steps of:

a) designating a set of proxy individuals;

b) providing one or more digital images for each proxy individual;

c) determining personal appeal values of each proxy individual to the observer;

d) providing one or more digital images for the candidate individual;

e) determining image similarity metrics between the digital images for the candidate individual and the digital images for each proxy individual;

f) determining similarity values between the candidate individual and each proxy individual responsive to the determined image similarity metrics;

g) estimating the personal appeal of the candidate individual to the observer by determining a weighted combination of the personal appeal values for the proxy individuals, wherein the weighted combination uses weighting coefficients that are determined responsive to the similarity values between the candidate individual and the corresponding proxy individual; and h) storing an indication of the estimated personal appeal in a processor-accessible memory.

* * * * *